May 11, 1965
W. D. KELLY
3,183,340
HEATING UNIT
Filed Jan. 23, 1961
2 Sheets-Sheet 1
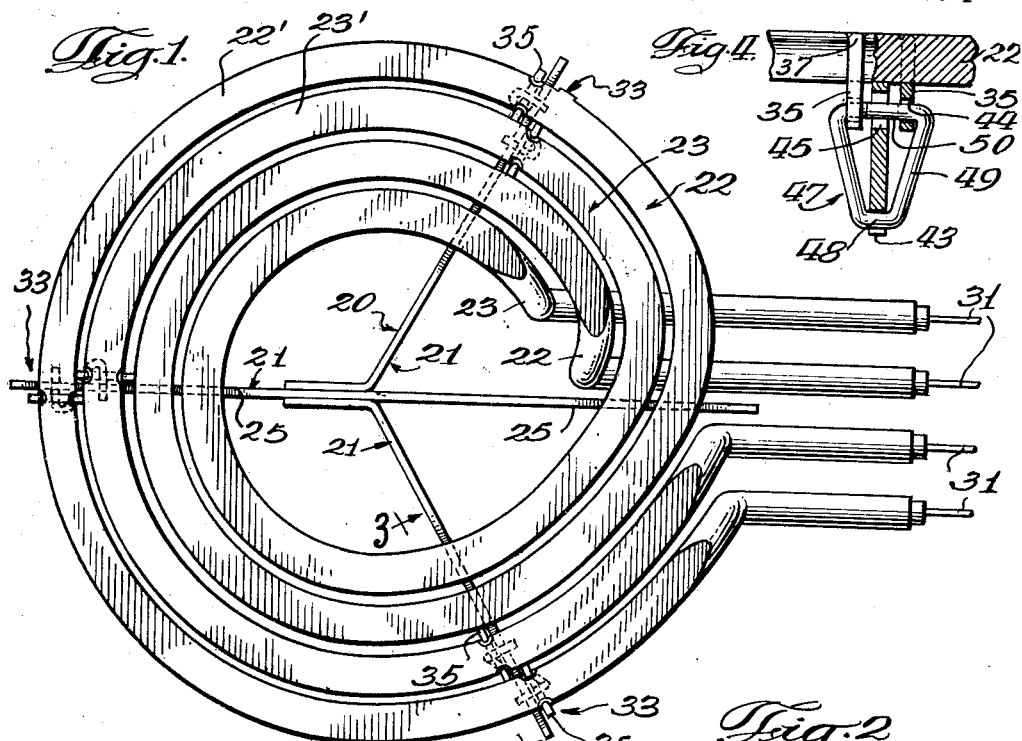
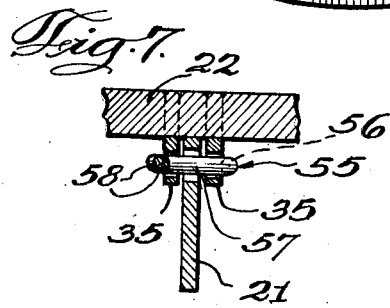
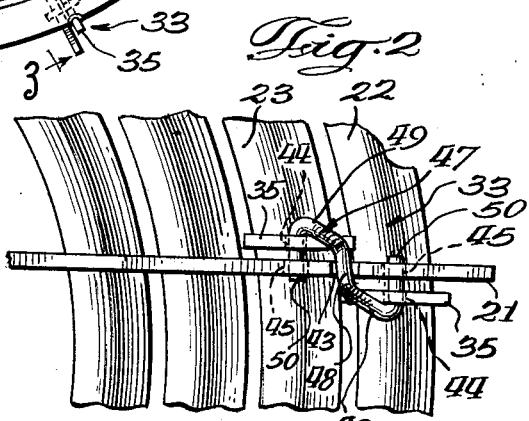
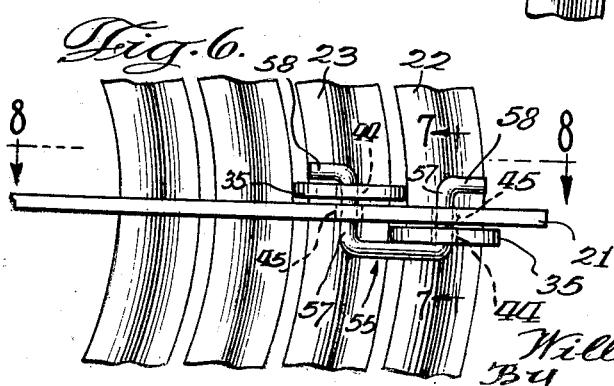
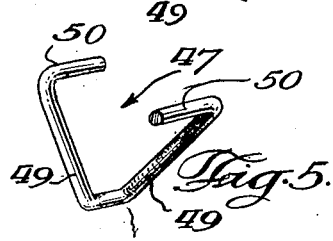
Inventor
William D. Kelly
By Hofgren, Brady, Wegner, Allen & Stellman
attorneys

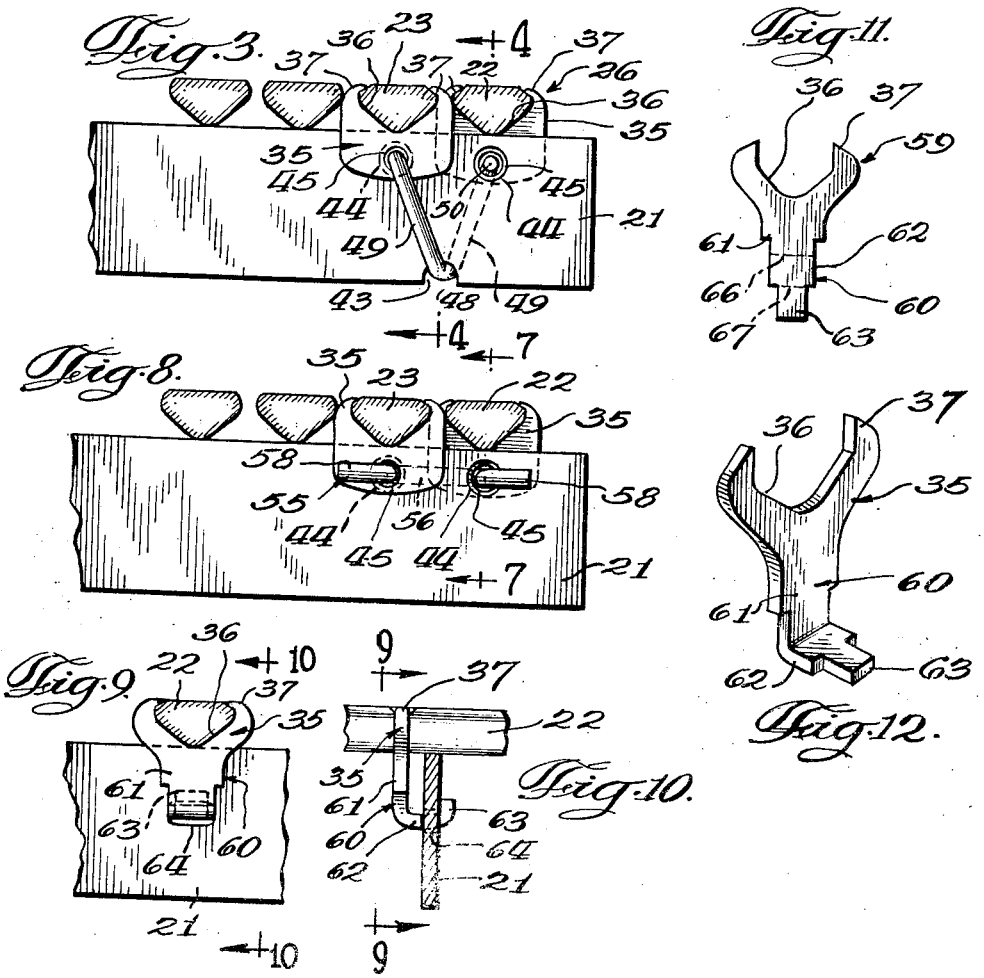

United States Patent Office 3,183,340
Patented May 11, 1965

3,183,340
HEATING UNIT
William D. Kelly, Western Springs, Ill., assignor to
Ferro Corporation, a corporation of Ohio
Filed Jan. 23, 1961, Ser. No. 84,379
2 Claims. (Cl. 219—455)

This invention relates to heating units, and more particularly to the assembly of components in electric heating units.

A principal object of this invention is to provide a heating unit having an improved mounting arrangement for a heating element.

A feature of the invention is the provision of a heating unit in which a heating element is tightly clamped to a bracket loosely secured to a support.

Another feature of the invention is the provision of a heating unit having an electric heating element mounted on a support by a bracket having a seat which conforms to the configuration of the heating element, with the heating element tightly clamped in the seat to retard movement between the heating element and the bracket, and with the bracket loosely secured to the support.

A further feature of the invention is the provision of an electric heating unit having a coiled, rigid sheath heating element mounted on arms of a spider by brackets substantially immovably clamped to the sheath of the outer convolution of the heating element, with the brackets loosely secured to adjacent spider arms for limited movement between the heating element and the spider to compensate for expansion and contraction of the heating element.

Further features and advantages will be readily apparent from the following description and drawings, in which:

FIGURE 1 is a top view of an embodiment of a heating unit;

FIGURE 2 is a fragmentary bottom view of the heating unit;

FIGURE 3 is a sectional view taken on the line 3—3 of FIGURE 1;

FIGURE 4 is a sectional view taken on the line 4—4 in FIGURE 3;

FIGURE 5 is a perspective view of a link forming part of the heating unit;

FIGURE 6 is a fragmentary bottom view of another embodiment of a heating unit;

FIGURE 7 is a sectional view taken on the line 7—7 in FIGURE 6;

FIGURE 8 is a sectional view taken on the line 8—8 in FIGURE 6;

FIGURE 9 is a fragmentary sectional elevational view of a joint in another embodiment of a heating unit;

FIGURE 10 is a sectional view taken on the line 10—10 in FIGURE 9;

FIGURE 11 is a plan view of a blank for forming a bracket illustrated in FIGURES 9 and 10;

FIGURE 12 is a perspective view of the bracket prior to installation in the heating unit; and FIGURES 13 through 16 illustrate a joint between a mounting bracket and an electric heating element, the joint being applicable to any of the foregoing embodiments, and more particularly:

FIGURE 13 is a top view of the joint loosely assembled;

FIGURE 14 is a sectional view taken on the line 14—14 in FIGURE 13;

FIGURE 15 is a top view of the completed joint; and,

FIGURE 16 is a sectional view taken on the line 16—16 in FIGURE 15.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

The invention is, in brief, directed to an electric heating unit in which at least one coiled electric heating element having a rigid outer sheath is mounted on the arms of a supporting spider. The heating element is secured to one or more of the spider arms by a bracket having a seat on which the heating element is tightly clamped by ears on the bracket crimped into tight engagement with the sheath. The bracket is loosely secured to the spider arms by attaching means in the form of a link, or an integral portion of the bracket, for limited movement of the heating element on the spider.

Referring to the drawings, in FIGURES 1–5 a support such as a spider 20 has a plurality of radially disposed supporting arms 21 centrally fixed to each other in any suitable manner, such as by spot welding. The spider is adapted to be received on a suitable support in a stove or similar appliance. A pair of coiled electric heating elements 22 and 23 having adajcent coplanar outer convolutions 22′ and 23′, respectively, are received on supporting surfaces 25 of the arms 21.

The heating elements 22 and 23 each have an electric resistor 28 within a rigid sheath 29 of suitable metal. Insulating material, such as magnesium oxide 30, is tightly packed between the resistor 28 and the sheath 29. Opposite resistor ends are each connected with a terminal pin 31 which is adapted to be received in a suitable terminal block.

The outer convolutions 22′ and 23′ of the coiled heating elements 22 and 23, respectively, are secured to each spider arm 21 by mounts 33 which include pairs of metal brackets 35 flanking opposite sides of the arm 21. As may best be seen in FIG. 16, each bracket 35 has a seat 36 conforming to the configuration of the adjacent portion of the heating element sheath 29. The heating element is secured in the seat by ears 37 on the bracket crimped into tight engagement with the heating element and overlying the seat for substantially immovably clamping the heating element in the bracket to avoid wear on the heating element as by a rubbing action of the bracket, and without adversely affecting the crystalline structure of the sheath 29 or tending to warp the heating element as might occur by heating the sheath in a welded or similar connection.

As may be most clearly seen in FIGURES 13–16, each heating element is provided with a pair of indentations for receiving the ears 37 to more tightly clamp the bracket 35 to the heating element. The reduction in cross sectional area of the heating element by the indentations 40 in the sheath 29 is compensated for by a slightly altered configuration of the sheath 29 so that the cross sectional area within the sheath adjacent the indentations 40 is the same as the cross sectional area of any other portion of the heating element, to provide for more even heating.

Attaching means for loosely securing the brackets to the adjacent spider arm 21 is provided and includes a link 47 and associated bracket and arm structure. Each link has a mid-portion 48 loosely received in an opening in the form of a notch 43 in a lower edge surface of the adjacent arm 21 opposite the arm supporting surface 25, a pair of legs 49 secured to opposite ends of the mid-portion 48 and extending transversely from the mid-portion upwardly along opposite sides of the adjacent arm 21. Each leg has an end with a transversely extending finger 50 generally parallel to an overlying mid-portion 48. Each finger extends loosely through one of a pair of aligned openings in the form of an aperture 44 in each bracket 35 and one of a pair of apertures 45 in the adjacent arm 21.

With reference to FIGURES 6–8, brackets 35 are substantially immovably clamped on heating elements 22 and 23 as previously described. The attaching means here take the form of links 55 including a mid-portion 56 having a pair of transversely extending parallel legs 57 joined to opposite ends of mid-portion 56 and each extending loosely through one of a pair of aligned openings in the form of one of two apertures 45 in the adjacent supporting arm 21 and an aperture 44 in each bracket 35. Transversely extending fingers 58 on the ends of the legs opposite the mid-portion provide means for retaining the link in the apertures. As in the foregoing embodiment, limited movement is provided between the heating element 22 and the support arms 21.

Referring to FIGURES 9–11, a bracket 59 is substantially immovably clamped to the heating element 22 as previously described. Attaching means here comprises a depending extension 61 integral with the bracket seat portion 36, with a transverse rectangular leg 62 on the end of the extension loosely received in a rectangular slot 64 in the spider arm 21, and means in the form of a finger 63 transverse to the leg for retaining the bracket in the slot 64. FIGURE 11 shows a blank for forming the bracket 59. The leg 62 is bent along the dotted line 66 and the finger 63 is bent along the dotted line 67.

I claim:

1. A heating unit comprising: a spider having a plurality of arms, each arm having opposite sides and a supporting surface; first and second coiled heating elements having adjacent coplanar outer convolutions received on the supporting surface of each arm; a pair of brackets flanking opposite sides of each arm, one bracket of each pair having a seat receiving a portion of the outer convolution of said first coiled heating element, and the other bracket of each pair having a seat receiving a portion of the outer convolution of said second heating element, each of said brackets having a pair of ears overlying the respective seat and tightly engaging the respective outer convolution for substantially immovably clamping the bracket to the last said outer convolution; first and second aligned pairs of apertures, respectively, in said one bracket and the adjacent arm, and in said other bracket and said adjacent arm; a link for each pair of brackets, each link having a mid-portion on one side of the adjacent arm, said mid-portion having opposite ends, fingers on said ends transverse to said mid-portion and loosely extending, respectively, through said first and second aligned pairs of apertures; and means for retaining said ends in said aligned apertures.

2. A heating unit comprising: an electric heating element having a substantially rigid outer sheath; a spider support for said heating element having a leg with an opening therein; a bracket rigidly secured to the sheath of said heating element and having an opening therein aligned with the opening in said support; and a link having a portion extending through the opening in said bracket and through the opening in said support, said link having opposite ends extending outwardly beyond the openings with means on the ends for retaining the link in said openings, attaching the bracket and the heating element to the support, said link portion being movable relative to said bracket and to said support to permit limited relative movement therebetween with changes in temperature thereof.

References Cited by the Examiner

UNITED STATES PATENTS

| 185,304 | 12/76 | Du Bois | 24—26 |
|---|---|---|---|
| 1,077,676 | 11/13 | Cubitt | 338—317 |
| 1,695,801 | 12/28 | Dibble | 338—317 |
| 2,068,222 | 1/37 | Bambenek et al. | 59—85 |
| 2,145,990 | 2/39 | Nelson | 59—85 |
| 2,478,809 | 8/49 | Deal | 338—317 |
| 2,662,158 | 12/53 | Vallorani et al. | 219—455 |
| 2,725,456 | 11/55 | Weyrick | 219—455 |
| 2,880,297 | 3/59 | Yohe | 219—548 X |
| 2,943,178 | 6/60 | Aldous | 219—463 |
| 3,068,340 | 12/62 | Bremer et al. | 219—445 |
| 3,072,775 | 1/63 | Ammerman et al. | 219—455 |

FOREIGN PATENTS

| 188,594 | 11/22 | Great Britain. |
|---|---|---|
| 489,683 | 8/38 | Great Britain. |

RICHARD M. WOOD, *Primary Examiner.*

MAX L. LEVY, *Examiner.*